Patented Oct. 3, 1950

2,524,472

UNITED STATES PATENT OFFICE 2,524,472

PROCESS FOR PREPARING THERMOSETTING AMINOPLAST COMPOSITIONS

Charles H. Parker, Jr., Stamford, Conn., assignor to American Cyanamid Company, New York, N. Y., a corporation of Maine No Drawing. Application November 8, 1946, Serial No. 708,808

7 Claims. (Cl. 260—67.6)

This invention relates to a process for the alkylation of thermosetting aminoplast resins. More particularly, it is directed to a process for alkylating a substantially dry urea-formaldehyde intermediate or amino-triazine-formaldehyde intermediate with alcohols having sparing solubility in water, and which in themselves are capable of etherification with aminoplast intermediates.

In the practice of this invention, it is advisable to employ a substantially dry aminoplast intermediate, such as dry dimethylol urea made by E. I. du Pont, spray dried methylol urea made from an aqueous syrup, a methylol urea obtained from a vacuum concentrated aqueous syrup, a spray dried methylol melamine obtained from a resinous syrup, or a methylol melamine obtained by vacuum concentrating an aqueous syrup thereof. In each of these intermediates, the bulk of the water is removed therefrom.

From the dry weight of the intermediate, which can be roughly determined by qualitatively determining the nitrogen content of a sample, an amount of alcohol equal to from about 75% to 90% of the theoretical quantity necessary to produce the full diether is added, and followed immediately by an acid catalyst, preferably an acid of the strength of phthalic, oxalic, or phosphoric acid.

To effect complete solution of the intermediate in the acidified alcohol, it is desirable to add an aqueous formaldehyde solution, water, or paraformaldehyde in various proportions. The quantity of such additions affect the final viscosity of the resin solution. The slurry obtained in the above-mentioned manner, is heated to reflux under strong agitation, and held for a few minutes, until it becomes relatively clear, and no residual intermediate remains undissolved. The system is then changed to distill over a water separator so that the upper layer is returned to the reaction sphere, and the lower layer withdrawn at intervals. This procedure is generally known as decantation. At the beginning of decantation, an amount of xylol equivalent to 20-25% of the expected final batch weight is gradually fed into the sphere of reaction. Decantation of the xylol feed is continued until a sample of the batch will tolerate dilution with at least 20 volumes xylol. At this point, the temperature is about 115°–120° C., and the lower layer contains practically all of the water which was present in the partially dry intermediate, and any added amount plus most of the water obtained from the etherification reaction. The upper layer in the decanter or separator may be returned to the batch or left in the system for a subsequent run. The batch is then filtered and is ready for use.

As far as is known, this process is specific for two alcohols. Namely, isobutanol, and n-butanol. They are the only alcohols from which the water was satisfactorily separated by azeotropic distillation, and which would readily form ethers with the methylol intermediate. Short-chain alcohols did not permit separation due to their solubility in water, and longer chain and secondary alcohols of the same or longer chains, did not form ethers with the intermediate with sufficient ease.

As specific forms of methylol ureas which were alkylated and dehydrated by this process to give excellent results, the following examples are given by way of illustration.

Intermediate I

This intermediate was a dry dimethylol urea made by E. I. du Pont. It was a crystalline product of coarse particle size, and containing 88–92% of active dimethylol urea.

Intermediate II

This intermediate was obtained by spray drying an aqueous syrup containing about 2.2 mols of formaldehyde per mol of urea prepared by heating the urea-formaldehyde mixture under a pH of 4–5 to effect reaction and thereafter rendering the syrup alkaline.

Intermediate III

This intermediate was prepared by heating to reflux an aqueous mixture comprising approximately 2.1–2.3 mols of formaldehyde per mol of urea at a pH of 7.5–8.5, and vacuum concentrating until approximately 75%–85% of the water initially present had been removed.

Similar methylol melamines were satisfactorily employed in the process of this invention with comparable results.

In order to illustrate the invention more fully, the following examples are given:

Example 1

2,295 parts of n-butanol, 900 parts of a 37% formaldehyde solution, 10 parts of 85% phosphoric acid, and 2360 parts of Intermediate I, were charged into a suitable reaction vessel and agitated for a few minutes at room temperature. Heat was then applied to raise the batch to reflux temperature where it was held until no undispersed intermediate remained. The system was then changed to distillation over decanter, while continuing to reflux with a constant return of the upper layer in the decanter to the batch, and the lower layer being removed to a suitable receiver. This decantation was continued with a feed of 1000 parts of xylol at the rate of 2-3 parts by weight per minute until the batch temperature reached 115° C., at which point the xylol tolerance exceeded 20 parts by volume. The remaining xylol of the 1000 parts was added to the batch at this time, the solution filtered, and was then ready for use. Products obtained in this manner had the characteristics of 48%-52% solids, a viscosity of E-K, an acid number of 1-3, and were water-white in color.

*Example 2*

Example 1 was repeated with the exception that 250 parts of water were substituted for the 900 parts of 37% formaldehyde solution. In this case, the products obtained had the characteristics of 48-52% solids, a viscosity of T-W, an acid number of 1-3 and were water-white in color.

*Example 3*

3390 parts of n-butanol, 490 parts of 37% formaldehyde solution, and 15 parts of 85% phosphoric acid were heated at 85° C. 3,080 parts of intermediate II were then slowly added thereto with vigorous agitation. When all of the intermediate had been added, the reaction vessel was closed, heated to reflux, and decanted under feed of 1500 parts of xylol, according to the procedure outlined in Example 1. The products obtained in this manner had the characteristics of 48%-52% solids, a viscosity of G-N, an acid number of 1-3, and were water-white in color.

*Example 4*

2350 parts of n-butanol were added to 2,800 parts of intermediate III, and heated to 80° C. under vigorous agitation. 10 parts of 85% phosphoric acid was then added, and a slightly exothermic reaction occurred carrying the batch to reflux in a very few minutes. The reaction was continued under reflux for a short period, 15-60 minutes usually being adequate. Thereafter the batch was decanted under a xylol feed of 1,000 parts according to the procedure outlined in Example 1. Products obtained in this manner had the characteristics of 48%-52% solids, a viscosity of Q-V, an acid number of 1-3, and were water-white in color.

*Example 5*

A charge of 138 parts of dried pentamethylol melamine, made by spray drying an aqueous syrup thereof, 150 parts of n-butanol and 0.2 part of oxalic acid were heated to reflux, and held at that temperature for approximately 2 hours. Then 0.6 part of 5 N sodium hydroxide aqueous solution was added to the reaction mixture and the vapor path changed to reflux over an apparatus which separated and removed the lower aqueous layer, and returned the upper butanol rich layer to the reactor. At the beginning of this decantation itself, a feed of xylol (70 parts by weight, total) was maintained at about 0.5 part per minute until about 20 parts of lower layer distillate had been recovered. The rate of feed was then increased to 1-2 parts per minute until all of the xylol had been added or the batch temperature had reached 110° C. In the latter case, any remaining xylol was added as rapidly as convenient. Decantation was continued until the batch temperature reached 112-115° C. and a lower layer recovery of 70-80 parts was obtained.

*Example 6*

The procedure of Example 5 was followed with the exception that 138 parts of oven-dried (50° C.) pantamethylol melamine aqueous syrup (approximately same water content as the spray dried product mentioned in Example 5) was employed.

*Example 7*

The procedure of Example 5, with the exception noted below, was followed using 200 parts of a kettle concentrated aqueous syrup of pentamethylol melamine, from which about 50% of the water had been removed, in place of the dried intermediates. The exception in the procedure was that the xylol feed was not started until the lower layer recovery reached about 80 parts by weight. When this amount had been recovered, the xylol feed was started and the procedure henceforth was the same, except that total lower layer recovery was 130-140 parts by weight.

Examples 1, 2 and 4 were repeated by substituting isobutanol for the n-butanol, with substantially equivalent results; it being noted, however, that dehydration required a slightly longer period of time. The procedure outlined in Example 3 was repeated using isobutanol in place of n-butanol. Solubility of the intermediate was not as good in this medium as n-butanol, and a small quantity of the intermediate remained undispersed, rendering the solution more difficult to filter.

The process of this invention eliminates the necessity for solvent recovery, and produces a satisfactory material without using excessive amounts of alcohol. This economy becomes apparent, when it is realized that 10% losses in rectification are not unusual, whereas according to the process of this invention, only the minimum amount of alcohol is consumed by the process. The process is particularly adapted to the production of resins having high hydrocarbon tolerance for use in surface coatings, at a very economical raw material cost.

I claim:

1. A process for preparing thermosetting butylated aminoplast resins comprising dispersing a substantially dry thermosetting aminoplast intermediate selected from the group consisting of methylol urea and methylol melamine in primary butanol present in an amount from 75% to 90% of the theoretical quantity required to react with the methylol groups of the intermediate, refluxing in the presence of an acid catalyst under strong agitation to effect an homogeneous solution, and distilling and returning the upper layer to the reaction sphere and removing the lower layer from the reaction sphere, while gradually feeding 20%-25% of the computed final batch weight of xylol into the sphere of reaction and continuing the distillation under decantation, wherein the upper organic layer is returned to the reaction sphere and the lower aqueous layer is removed from the reaction sphere, until the aromatic hydrocarbon tolerance of the batch is at least 20 to 1.

2. A process for preparing butylated urea-formaldehyde resins comprising mixing a substantially dry dimethylol urea intermediate with an amount of primary butanol from 75% to 90% of the theoretical quantity required to react with the methylol groups of the intermediate, an acid catalyst, and an aqueous formaldehyde solution, heating this slurry to reflux under strong agitation until all the residual intermediate is dissolved, distilling under decantation wherein the upper layer is returned to the reaction sphere and the lower layer is removed from the reaction sphere while gradually feeding 20%–25% of the final computed batch weight of xylol into the sphere of reaction, and continuing the distillation under decantation, wherein the upper layer is returned to the reaction sphere while the lower layer is removed from the reaction sphere, until the aromatic hydrocarbon tolerance of the batch is at least 20 to 1.

3. A process for preparing butylated urea-formaldehyde resins comprising dispersing a substantially dry dimethylol urea intermediate in primary butanol present in an amount from 75% to 90% of the theoretical quantity required to react with the methylol groups of the intermediate, refluxing in the presence of phosphoric acid catalyst under strong agitation to effect an homogeneous solution, and distilling under decantation and returning the upper layer to the reaction sphere and removing the lower layer from the reaction sphere, while gradually feeding 20%–25% of the computed final batch weight of xylol into the sphere of reaction and continuing the distillation under decantation, wherein the upper layer is returned to the reaction sphere and the lower layer is removed from the reaction sphere, until an aromatic hydrocarbon tolerance of at least 20 to 1 is obtained.

4. A process for preparing butylated melamine-formaldehyde resins comprising dispersing a substantially dry methylol melamine intermediate in primary butanol present in an amount from 75% to 90% of the theoretical quantity required to react with the methylol groups of the intermediate, refluxing in the presence of acid catalyst under strong agitation to effect an homogeneous solution, and distilling under decantation, and returning the upper layer to the reaction sphere and removing the lower layer from the reaction sphere, while gradually feeding 20%–25% of the computed final batch weight of xylol into the sphere of reaction, and continuing the distillation under decantation, wherein the upper layer is returned to the reaction sphere and the lower layer is removed from the reaction sphere, until the aromatic hydrocarbon tolerance of the batch is at least 20 to 1.

5. A process for preparing thermosetting butylated aminoplast resins comprising dispersing a substantially dry methylol resin selected from the group consisting of methylol urea and methylol melamine thermosetting aminoplast intermediate and primary butanol present in an amount from 75% to 90% of the theoretical quantity required to react with the methylol groups of the intermediate, refluxing in the presence of an acid catalyst until a homogeneous intermediate is obtained, and distilling under decantation, wherein the upper butanol rich layer is returned to the reaction system while the lower aqueous layer is removed from said reaction system, while gradually charging 20%–25% of the computed final batch weight of xylol into the sphere of reaction.

6. A process for preparing butylated urea-formaldehyde resins comprising dispersing a substantially dry dimethylol urea intermediate in primary butanol present in an amount from 75%–90% of the theoretical quantity required to react with the methylol groups of the intermediate refluxing in the presence of an acid catalyst until a homogeneous intermediate is obtained, and distilling under decantation, wherein the upper butanol rich layer is returned to the reaction system and the lower aqueous layer is removed from the reaction system, while gradually feeding 20–25% of the computed final batch weight of xylol into the sphere of reaction.

7. A process for preparing butylated melamine-formaldehyde resins comprising dispersing a substantially dry methylol melamine intermediate in primary butanol present in an amount from 75–90% of the theoretical quantity required to react with the methylol groups of the intermediate, refluxing in the presence of an acid catalyst until a homogeneous intermediate is obtained and distilling under decantation, wherein the upper butanol rich layer is returned to the reaction system and the lower aqueous layer is removed from the reaction system, while gradually feeding 20–25% of the final batch weight of xylol into the sphere of reaction.

CHARLES H. PARKER, Jr.

REFERENCES CITED

The following references are of record in the file of this patent:

UNITED STATES PATENTS

| Number | Name | Date |
|---|---|---|
| 2,171,882 | Ludwig | Sept. 5, 1939 |
| 2,191,957 | Edgar et al. | Feb. 27, 1940 |
| 2,217,372 | Ludwig | Oct. 8, 1940 |
| 2,221,708 | Hodgins et al. | Nov. 12, 1940 |

FOREIGN PATENTS

| Number | Country | Date |
|---|---|---|
| 484,200 | Great Britain | Apr. 28, 1938 |